United States Patent
Bjerknes et al.

(10) Patent No.: US 8,872,467 B2
(45) Date of Patent: Oct. 28, 2014

(54) METHOD AND SYSTEM FOR START AND OPERATION OF AN ELECTRICALLY DRIVEN LOAD

(75) Inventors: Ole-Johan Bjerknes, Oslo (NO); Trygve Lund, Oslo (NO)

(73) Assignee: Aker Engineering & Technology AS, Lysaker (NO)

(*) Notice: Subject to any disclaimer, the term of this patent is extended or adjusted under 35 U.S.C. 154(b) by 0 days.

(21) Appl. No.: 13/589,705

(22) Filed: Aug. 20, 2012

(65) Prior Publication Data

US 2012/0313372 A1    Dec. 13, 2012

Related U.S. Application Data

(62) Division of application No. 12/441,046, filed as application No. PCT/NO2007/000322 on Sep. 12, 2007, now Pat. No. 8,269,449.

(30) Foreign Application Priority Data

Sep. 12, 2006  (NO) .................................. 2006-4084

(51) Int. Cl.
*H02P 1/46* (2006.01)
*H02P 1/50* (2006.01)
*H02P 3/18* (2006.01)
*H02P 1/26* (2006.01)
*F01D 15/10* (2006.01)

(52) U.S. Cl.
CPC .............. *H02P 1/26* (2013.01); *F05D 2220/76* (2013.01); *F05D 2260/85* (2013.01); *F01D 15/10* (2013.01)
USPC ............. 318/723; 318/140; 318/151; 307/18; 290/46; 290/52

(58) Field of Classification Search
CPC ............................... F25J 1/0284; F25J 1/0283
USPC .......... 318/723, 140, 151; 290/46, 52; 307/18
See application file for complete search history.

(56) References Cited

U.S. PATENT DOCUMENTS 5,152,141 A    10/1992  Rumford et al.
5,689,141 A *  11/1997  Kikkawa et al. ................ 290/52

(Continued)

FOREIGN PATENT DOCUMENTS

JP       07-067369       3/1995
WO       WO97/33131      9/1997

(Continued)

OTHER PUBLICATIONS

International Preliminary Report on Patentability for corresponding International Application No. PCT/NO2007/000322 dated Dec. 15, 2008.
Norwegian Search Report for corresponding Norwegian Application No. 2006-4084 dated Mar. 28, 2007.

*Primary Examiner* — Erick Glass
(74) *Attorney, Agent, or Firm* — Heslin Rothenberg Farley & Mesiti P.C.; Victor A. Cardona, Esq.

(57) ABSTRACT

A method and system for starting and operating an electrically driven load, e.g. a compressor or pump, by power supply from a mechanical driver, e.g. a turbine or combustion engine, whereby the load is mechanically connected to a first electrical machine, and the mechanical driver is mechanically connected to a second electrical machine. The first electrical machine is electrically interconnected to the second electrical machine at a standstill or when the first and or second machine have low speed. In an acceleration phase, the first electrical machine is accelerated by accelerating the second electrical machine with the mechanical driver. When the first electrical machine has reached a predefined rotational speed, the first machine is synchronized with a local electrical power network and connected it to that network.

24 Claims, 5 Drawing Sheets

(56) References Cited

U.S. PATENT DOCUMENTS

| | | |
|---|---|---|
| 6,640,586 B1 | 11/2003 | Baudat et al. |
| 7,114,351 B2 * | 10/2006 | Jones et al. .................. 62/611 |
| 8,436,988 B2 * | 5/2013 | Ogawa .......................... 356/246 |
| 2005/0047789 A1 | 3/2005 | Meli et al. |
| 2005/0116541 A1 | 6/2005 | Seiver |

FOREIGN PATENT DOCUMENTS

| | | |
|---|---|---|
| WO | WO03/073025 | 9/2003 |
| WO | WO2005/047789 A2 | 5/2005 |

\* cited by examiner

METHOD AND SYSTEM FOR START AND OPERATION OF AN ELECTRICALLY DRIVEN LOAD

CROSS REFERENCE TO RELATED APPLICATIONS

This application is a divisional of U.S. Ser. No. 12/441,046 filed on Mar. 12, 2009, which was a national stage of PCT International Application No. PCT/NO2007/000322, filed on Sep. 12, 2007, and published in English on Mar. 20, 2008 as WO 2008/033033 A2, which claims priority to Norwegian Application No. 2006-4084, filed on Sep. 12, 2006, the entire disclosures of which are incorporated herein by reference.

FIELD OF THE INVENTION

The present invention is related in general to large electrical fixed-speed drives, especially from the 10 MW range and above. For subsea applications the invention may be applicable to all drive sizes (also equipment with lower power consumption, e.g. having a weak power supply system). The present invention is particularly suitable for large and extra-large gas compressor drives and pump drives, but may also be used for operating other types of high power equipment for different applications. It is highly suitable for operating equipment for processing natural gas, e.g. production of Liquefied Natural Gas in LNG-plants where compressors for liquefying natural gas at a gas processing plant are driven by an electric drive system.

BACKGROUND AND PRIOR ART

Oil and gas related projects often include large pump and/or compressor drives that are designed to be suitable for cost efficient construction, start-up and operation under various conditions. A relevant project example would be a LNG-plant.

Liquefied Natural Gas or LNG is a product from the cooling down of natural gas to a temperature at which the natural gas becomes liquid. Natural gas can be transported in large volumes in liquefied state in an economic manner, particularly in situations where pipelines are not available or are to expensive or time consuming to install. Typically, LNG tankers transport large volumes of natural gas by sea from a production site to a consumption site or an intermediate storage site.

International Patent Application Publication no. WO 97/33131 describes an installation for producing liquefied natural gas, where the main cooling stages are mechanically interconnected and are arranged to be driven by a single common gas turbine, with an auxiliary engine being arranged for start-up of the gas turbine. Disadvantages of mechanically interconnecting the driving and driven parts of the installation are, among others a long train of rotating machines on a common shaft, which takes considerable space and requires a carefully balanced shaft, and that the driving and driven machines must be situated close to each other.

At present the production of LNG is often based on gas and or steam turbines to provide power to drive the refrigeration processors used to liquefy the natural gas. As an example, International Patent Application Publication no. WO 2005/047789 A2 describes a drive system for LNG production in which a refrigeration compressor is driven by a gas turbine coupled together with an electric starter motor on a common drive shaft running between gas turbine and the compressor.

Compressor drives based on a gas turbine as a mechanical driver located relatively near to the compressor, have the hazards related to a gas burning device normally operating at a fairly high temperature arranged fairly close to a refrigeration compressor in an LNG-plant. Further, the gas turbine normally produces an amount of exhaust gas which as to be dealt with in some manner to limit the hazards in a natural gas processing plant. Anyone that considers constructing or operating LNG-plants onshore, offshore or anywhere else will understand that local gas burners and hot exhaust gas emissions in relation to hazardous areas is not an ideal solution, and a replacement solution that also could improve production regularity would most likely be attractive. The obvious alternative option is frequency controlled electric drives that also has to be used in various combinations with turbine drives. The plant operated by the company Statoil at Hammerfest in Norway is an example of a frequency controlled LNG-plant.

U.S. Pat. No. 5,689,141 describes a compressor drive system for a natural gas liquefaction plant having a frequency converter assisted start by acceleration of the gas turbine to ram-speed and ignition. During normal operation at fixed speed the electric motor works as a generator to convert excess mechanical power generated by a gas turbine into electrical energy and feeding this electric energy to the main power source of the plant. In this case the gas turbine and compressor are assembled on a common shaft.

A frequency converter is a quite large piece of equipment. To transfer power rates in the order of 50 MW the frequency converter could fill a four or five storey building with a base of about 1000 $m^2$. Despite the size and costs of these frequency converters, they have often been considered necessary equipment when transferring power electrically between driving and driven equipment when the power rate is in the order of 10 MW or more.

U.S. Pat. No. 6,640,586 B1 describes a natural gas liquefaction process system employing mechanical drivers and electric motors as compressor drivers. Various combinations of compressors and electrical motors are described, used for various types of refrigerants. This publication includes a brief description of several drawbacks of using conventional gas turbines in LNG plants and discloses various ways of combining compressors and electric motors for driving the compressors in an LNG plant. The electric motors are in these solutions often used for startup by various methods and possibly to assist gas turbines during normal operation and the mechanical driven string some times also include steam turbines.

In view of the above described prior art and the drawbacks pointed out in the closest prior art it is desirable to provide new and inventive solutions which can overcome one or more of the above cited drawbacks, while obtaining optimum functionality in a compressor driver system for an LNG plant or other purposes.

OBJECT OF THE INVENTION

It is a general object of the invention to provide a load drive system, e.g. for a compressor or pump, where the necessity for expensive and large frequency converter equipment is greatly reduced. This will reduce the cost, weight and volume of the overall system while also reducing the complexity in operating and constructing the plant.

A second object of the invention is to provide a general load, e.g. compressor or pump, drive system that can be used for a processing plant, especially a natural gas liquefaction plant and to reduce the cost for stand-by units and spare parts for back-up purposes.

It is a further additional object of the present invention to provide a new drive compressor or pump arrangement, especially for an oil and/or natural gas processing plant in which it is not practical to couple a gas or steam turbine to the mechanical shaft of the compressor or pump in order to drive it, such as for example in closed spaces where an electric only drive arrangement is preferable.

It is a still further additional object of the present invention to provide a new drive arrangement suitable for applications were it can bridge long step-out distances that often prevents the use of soft-start methods or direct on line start as typical for fixed speed drive operation. Typical examples would be remote drive locations that could be quite inaccessible, especially if located subsea.

It is another further additional object of the present invention to provide a new drive arrangement suitable for flexible generator to motor assignment in order to enable start up and operation of various combinations of motors and generators quite independent of each other and on coexisting electrical power systems. It is also an object to provide operation of coexistent power systems partially independent of each other, i.e. in island-mode, with a quite freely selectable system frequency within each power system which is operated in island-mode. For these the use of various electrical power conversion principles could enable exchange of electrical power to enhance the power generation margin within each power system operated in island mode.

SHORT DESCRIPTION OF THE INVENTION

In a first aspect of the invention there is provided a method of start and operation of an electrically driven load, e.g. a compressor (1) or pump, by power supply from a mechanical driver, e.g. a turbine or combustion engine, whereby the load is mechanically connected to a first electrical machine, and said mechanical driver is mechanically connected to a second electrical machine, characterized in
1) electrically interconnecting the first electrical machine to the second electrical machine at standstill or when the first and or second machine have low speed;
2) in an acceleration phase, accelerating the first electrical machine by accelerating the second electrical machine with the mechanical driver; and
3) when the first electrical machine has reached a predefined rotational speed, synchronizing it with a local electrical power network and connecting it to that network.

With this method it is possible to start and drive the first electrical machine without being dependent on a frequency converter coupled between the generator and the motor at all time.

In a second aspect of the invention there is provided a method of start and operation of an electrically driven load, e.g. a compressor (1) or pump, which load is driven by a first electrical machine, by supplying power from a mechanical driver, such as a turbine or combustion engine, or a frequency converter receiving power from an external power network, or a local source, such as the mechanical driver, characterized in,
1) in an acceleration phase, accelerating the first electrical machine as a motor for said load, from zero, near zero or at low speed, by either
   a) accelerating a second electrical machine connected to said mechanical driver, the second electrical machine being electrically interconnected to said first electrical machine and functioning as a generator, or
   b) supplying power to the first electrical machine from said frequency converter,
2) synchronizing the first electrical machine with a local power network, and then
3) after the acceleration phase, operating the first electrical machine by providing it with power from the local power network, which network is provided with power from
   a) an external power network, or
   b) at least one mechanical driver connected to at least one second electrical machine,
   thereby rendering the frequency converter available for other tasks.

Preferably the frequency converter, if used, is disconnected when or after the second electrical machine is/has been connected. Thereby the frequency converter is free to be used to start up another generator/motor combination or for other purposes.

In a preferable embodiment of the method according to the first or second aspect of the invention the acceleration of said second electrical machine is provided by starting a steam turbine at or near zero speed. The steam turbine is mechanically coupled with said second electrical engine. Thereby the use of a frequency converter for start up is unnecessary.

In a still preferable embodiment of the method according to the first or second aspect of the invention the acceleration of the second electrical machine is provided by accelerating a gas turbine running from its minimum speed and up to the rated speed, while being mechanically coupled to the second electrical engine. This also removes the need for a frequency converter for start up.

In an especially preferable embodiment of the second aspect of the invention, the frequency converter is used, after the acceleration phase, to adapt power from the external power network to the characteristics of the local power network, or adapt power from the local power network to the characteristics of the external power network, thereby rendering it possible to import and/or export power to and/or from the local power system.

In a third aspect of the invention there is provided a start and operation system for the start and operation of at least one mechanical load, which load is connected to and driven by at least one first electrical machine, characterized in that power to the first electrical machine is provided with a mechanical driver which is mechanically connected to a second electrical machine functioning as a generator, which second electrical machine is adapted to be uniquely connected to said first electrical machine or a plurality of first electrical machines, whereby the system is adapted to accelerate said first electrical machine(s) by controlled delivery of power from the second electrical machine to the first electrical machine.

In a preferred embodiment of the third aspect of the invention, said load is arranged to operate at a fixed or synchronous speed relative to the generator during normal operation. Thereby the need for a frequency converter connected between the generator and the load is removed.

In a fourth aspect of the invention there is provided a start and operation system for the start and operation of at least one mechanical load, such as a compressor or pump, which load is connected to and driven by at least one first electrical machine, characterized in that the system comprises
   a mechanical driver connected to a second electrical machine, which second electrical machine is adapted to be uniquely electrically connected to one or more first electrical machines, thereby working as a generator during an acceleration phase or a succeeding operation phase, a frequency converter, such as a VFD (variable frequency drive), which is adapted to be uniquely connected to one or more first electrical machines, thereby accelerating said first electrical machine in an acceleration phase or operating the first electrical machine in an operation phase, whereby the frequency converter is adapted to be provided with power from either an external power network or a local power network.

In a preferred embodiment of the third or fourth aspect of the invention, the system comprises a power line with at least a double bus bar system to enable parallel utilization of other electrical equipment independent of the actions of the generator for starting the motor which drives the compressor.

In still a preferred embodiment of the system according to the invention the second electrical machine is driven by a turbine device or a diesel engine, etc.

In a yet a still preferred embodiment of a system according to the invention the turbine comprises a gas turbine and/or a steam turbine.

In still further preferable embodiments of the system according to the invention the first electrical machine comprises an electrical synchronous machine and/or an electrical induction engine.

In another preferable embodiment of the fourth aspect of the invention the frequency converter is adapted to adapt power from the local power network to the characteristics of the external power network, enabling export of power from the local to the external power network.

Having now mentioned the most important aspects of the invention, the invention will now be described in more detail with reference to the appended drawings in which.

Figure 1:
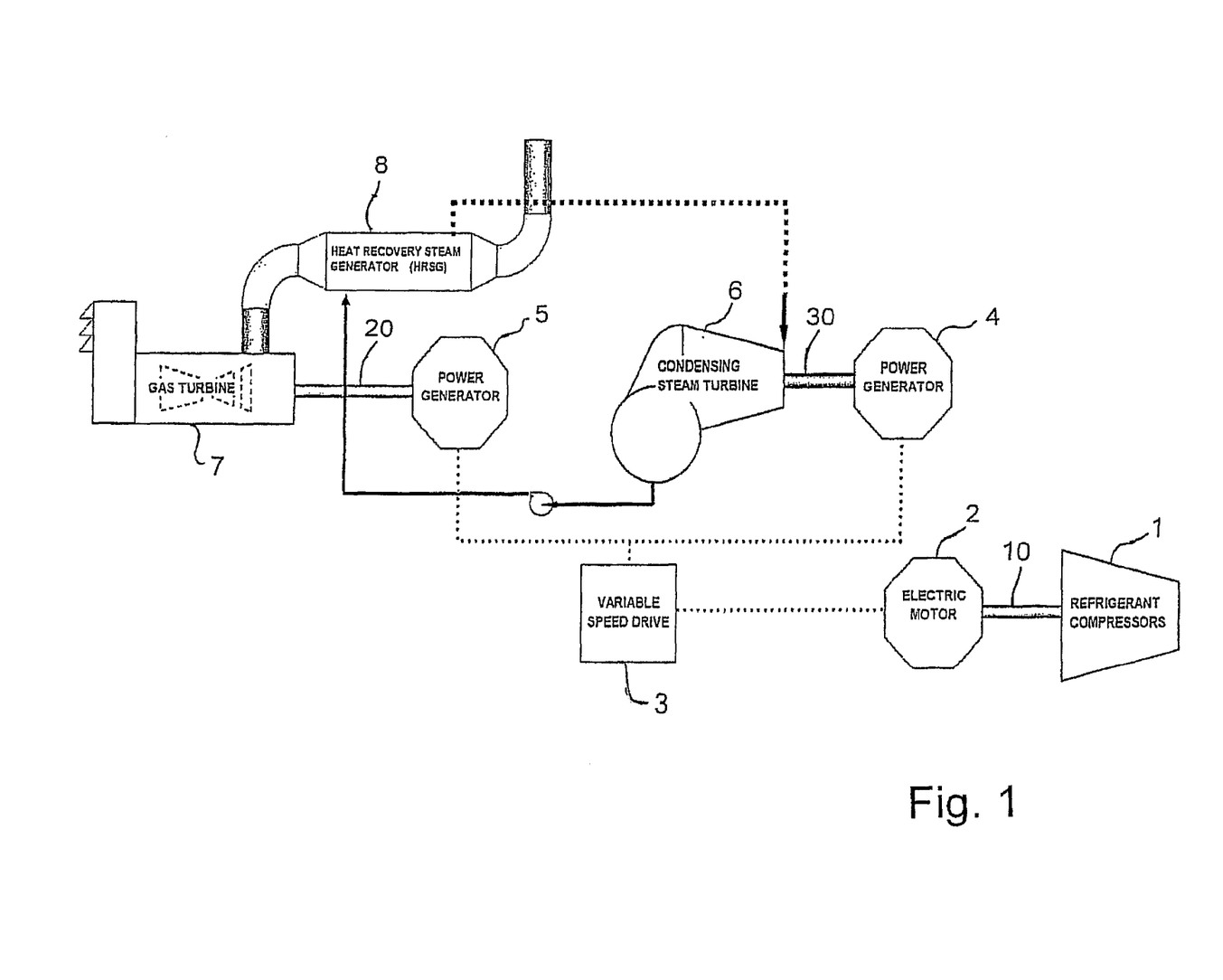
FIG. 1 illustrates a state of the art solution for driving a refrigerant compressor for liquefying natural gas, typical for drive dedicated frequency converters.

FIG. 1 is included to describe a conventional present technique for providing an introduction to the invention. FIG. 1 illustrates combined cycle power generation (generating steam and electricity in a cogeneration plant) where an electrical variable speed drive (VSD) controls the speed of an electric motor. A refrigerant compressor 1 is driven by the electric motor 2 which is mechanically coupled to the drive shaft 10 of the compressor 1. In order to control the speed of the electric motor 2 it is a known technique to insert a variable speed drive (also called variable speed or frequency drive— VSD or VFD) 3 between a power generator 4, 5 and the electric motor 2. The VFD operates by converting the input of an AC signal to DC, then generating an AC output at a different frequency. The frequency of the electric output signal of the VFD controls the speed of an electric motor and a VFD allows for infinite frequency control and hence motor speed control. Due to the VSD/VFD the turbine 7 and generator 5 may operate at a relatively constant speed while the electric motor 2 and compressor 1 may vary in speed according to the needs. These principles are often used for a wide range of compressor drives.

For liquefying natural gas as part of a gas production plant several tenths of MW of electric power will be required to drive a compressor of sufficient capacity, thus the components, for example the VFD, are typically bulky units, having a considerable associated economic cost in design, installation and service.

Figure 2:
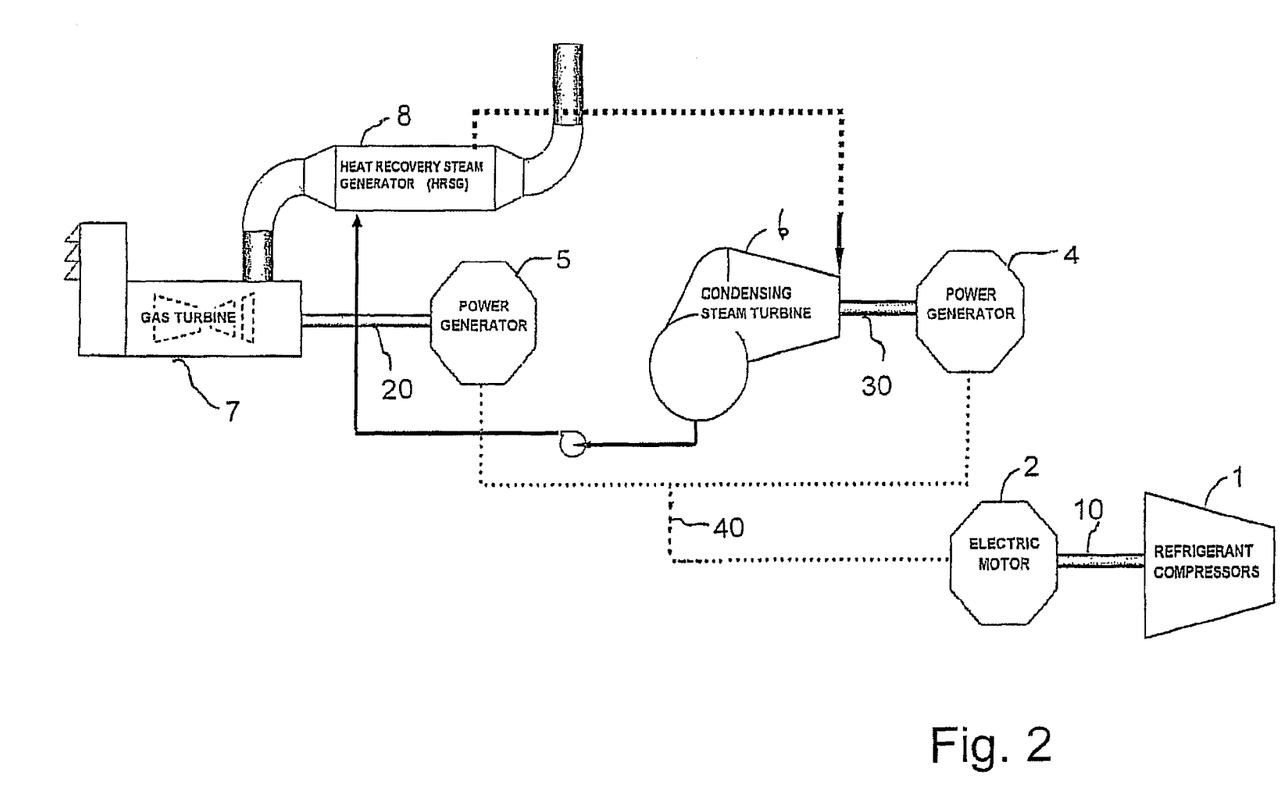
FIG. 2 illustrates a LNG compressor driver circuit according to a principle of the invention for performing the methods according to the invention.

FIG. 2 illustrates how such a LNG compressor driver according to the invention can have a simplified form, provided the compressors are started by a suitable method, and wherein the compressor in normal operation is arranged to be driven at a speed which is synchronized with the speed of the turbine. The suitable methods for operating the system of FIG. 2 will be explained in the following, where particular detail will be given to the procedures for starting the compressor.

FIG. 2 illustrates how a refrigerant compressor 1 is driven by an electric motor 2. The electric motor 2 is electrically powered via an electric power transmission network 40 by the power generator 4 and/or power generator 5. The power is transferred directly without the use of a variable speed/frequency drive. The power generators 4, 5 may be driven by a steam turbine 6 and a gas turbine 7, respectively.

Figure 3:
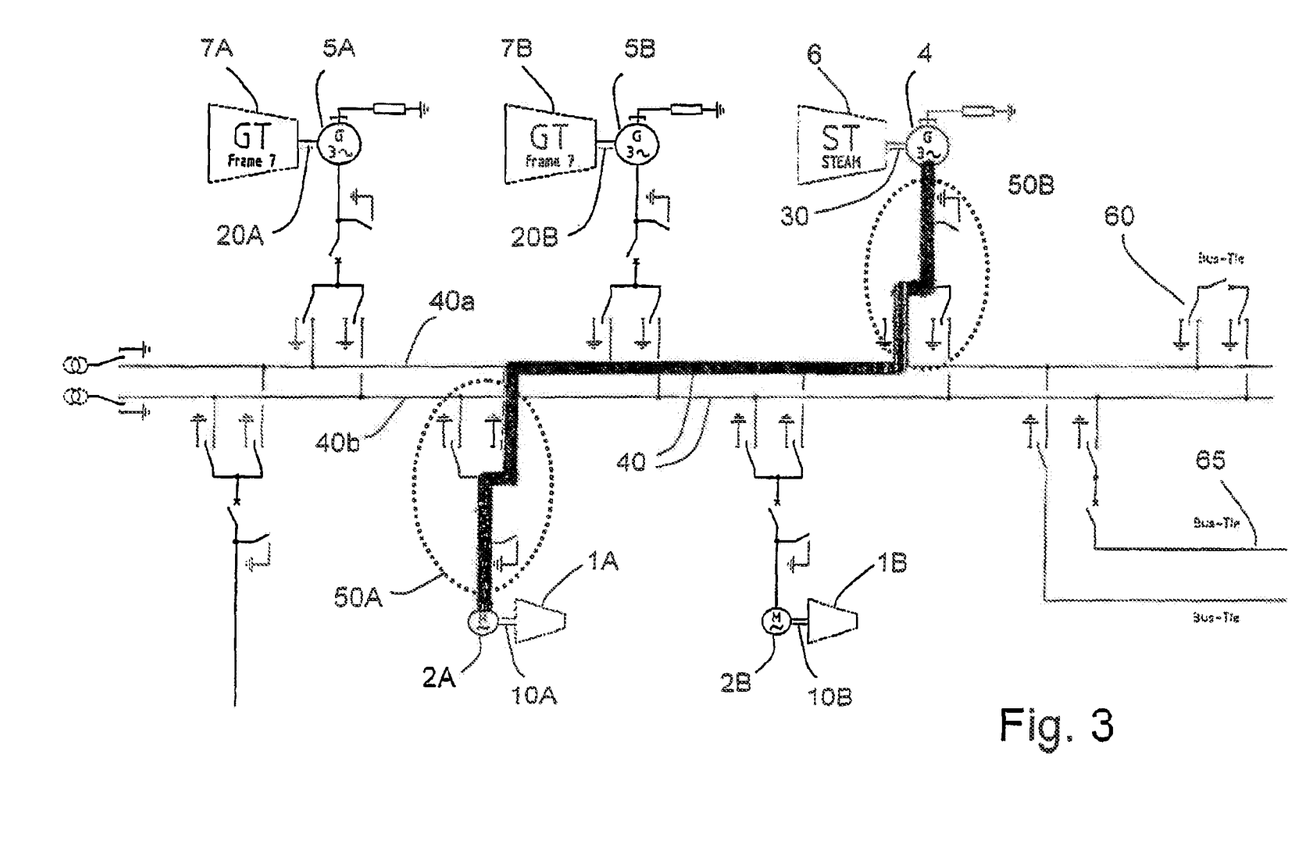
FIG. 3 illustrates a more detailed diagram of a first example embodiment of a LNG compressor driver circuit according to the invention.

FIG. 3 illustrates in some more detail an example embodiment of how the principle of the invention as illustrated in FIG. 2 can be realized in a more complex system. As in FIG. 2 a refrigerant compressor 1A, 1B is driven by an electric motor 2A, 2B, the electric motor being mechanically coupled to the drive shaft 10A, 10B of the compressor. The electric motor can for instance be connected via a standard switchgear or switchboard arrangement consisting of two sectionalizing switches and a power circuit breaker (typical for gas insulated switchgear assemblies) 50A, 50B to an electric power transmission network 40, which in the example consists of two bus bars 40a, 40b. Power to the electric motor 2A, 2B is in the example on FIG. 3 supplied by a power generator 4 which is driven by a steam turbine 6. The power generator 4 is coupled to the power transmission network 40 via a second switch arrangement 50B, which may be similar to switch arrangement 50A.

Preferably, the power transmission network 40 comprises a double bus bar type network for enabling parallel utilization of other electrical equipment independent of the actions of the power generator 4 for starting the motor 2A, 2B which drives the compressor 1A, 1B. This means that the generators 4, 5a, 5b can be connected to the motors 2a, 2b through either of the bus bars 40a, 40b.

The network 40 may be connected to another network through bus ties 60.

In addition to the steam turbine 6 and generator 4, the system also comprises gas turbines 7A, 7B and associated generators 5A, 5B. They may also be used to drive the motors 2A, 2B, or together with the steam turbine 6 supply power to the motors 2A, 2B.

Figure 4:
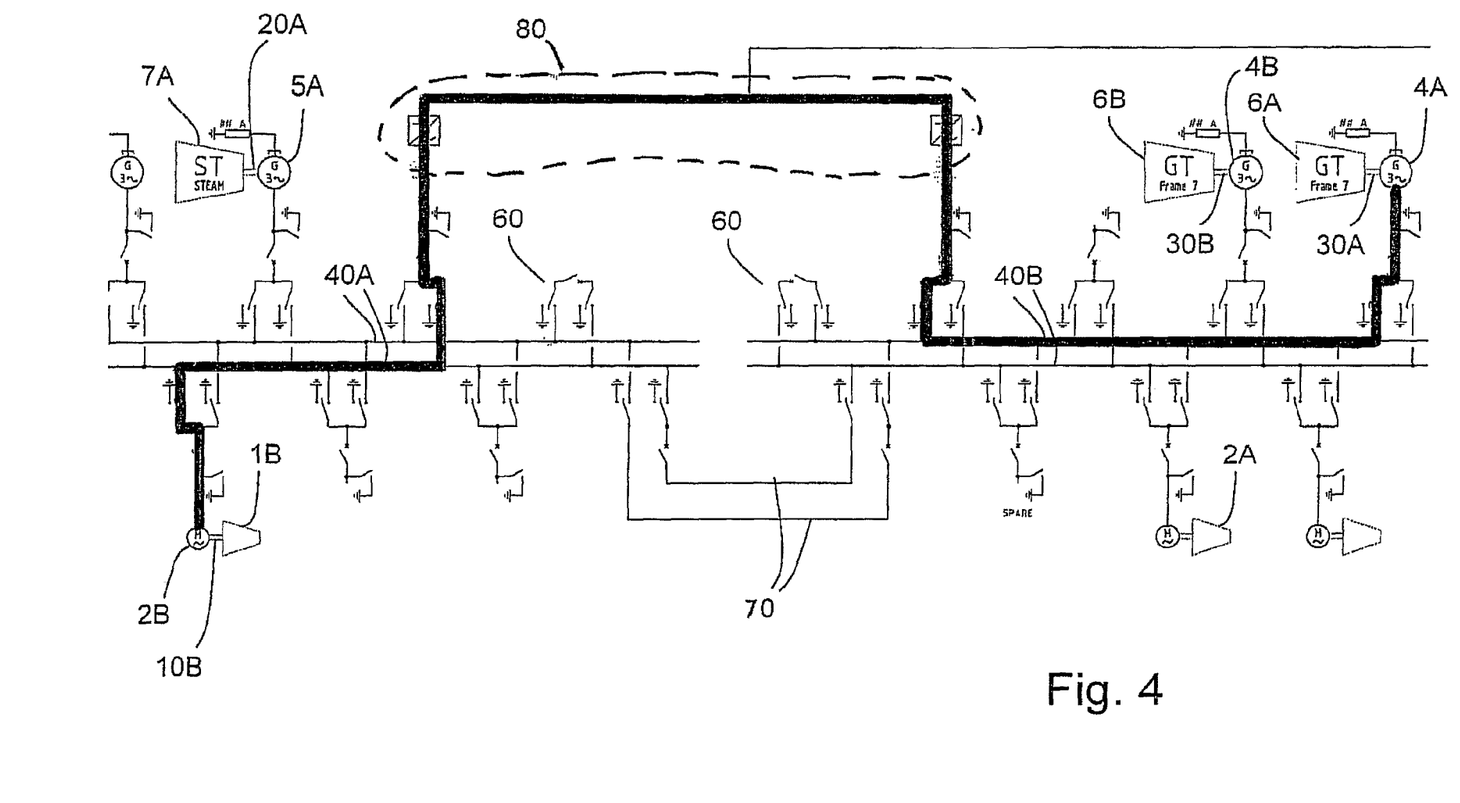
FIG. 4 illustrates a more detailed diagram of a second example embodiment of a LNG compressor driver circuit according to the invention.

In FIG. 4 a second detailed example embodiment of an LNG drive concept according to the present invention is shown. The system of FIG. 4 is in principle similar to the system of FIG. 3. However a frequency converter device 80 is included. This could be adapted to run a traditional frequency converter based compressor drive. In this case the frequency converter device 80, which is a DC-link interface, connects a first power grid 40B to which a generator 4A and a generator 4B, which are mechanically coupled to a gas turbine 6A and a gas turbine 6B, is connected, to a second power grid 40A to which a motor 2B and a generator 5A is connected. The motor 2B is mechanically coupled to a compressor 1B and the generator 5A is mechanically coupled to a steam turbine 7A.

Through the frequency converter 80 power at variable frequency can be supplied to the electric motor 2B at start-up, e.g. from the gas compressor 6A and the generator 4A. Once started, the motor 2B may run at a fixed frequency, for example 60 Hz, of power supply from the generator 4a.

After this start sequence, a synchronous bypass arrangement, including a bus-tie 60 or 70 may replace the frequency converter device 80, i.e. the frequency converter device 80 is disconnected, while a synchronous bypass arrangement 60 or 70 connects the first and second power grids 40A, 40B. Thus, it will be possible to drop off the electrical motor 2B on a local power grid with fixed frequency and voltage levels, once it has been started. The frequency converter device 80 is now free to be used for starting another electric motor.

As an example, re-use of a large frequency converter in a synchronous speed concept is to use it as one end in a HVDC-Light connection, e.g. as manufactured by the company ABB, or in a HVDC-Plus connection, e.g. as manufactured by the company Siemens AG, or a similar system arrangement normally dedicated for local drives or alternatively various system interconnections used to bridge regional differences or connecting to some other distant location where there is a market for electrical power.

The HVDC connection could for example be included in the power generation sparing/redundancy philosophy if there are possibilities for both electrical power export and import in the remote end, i.e. cost savings is possible by reducing the number of gas turbine drives. Start up power supply could be from a local or remote connection in addition to or instead of generated by the shown generator.

Having now described some embodiments of the LNG compressor drive according to the invention, some procedures for starting the electric motor 2 will be further explained in detail.

Start Method No. 1

Large or XL (extra large) Compressor Drive Start with variable electrical system frequency and voltage, especially using a steam turbine driven generator (referring to FIG. 3):

1. A steam turbine driven generator 4 is stopped (a steam turbine will normally have to be warmed up before putting any significant load on it) and assigned to start a specific electric motor 2A driven compressor 1A. Preferably, the generator and motor are connected in "island mode", i.e. these two devices are connected so as not to be interfered by other devices, for example by utilizing only one of the bus bars 40a, 40b of a double bus bar system, as shown on FIG. 3.
2. The generator 4 and motor 2A are then electrically connected at "standstill" and their excitation systems are activated by supplying power from another source.
3. Then the whole line comprising turbine 6, generator 4, motor 2A and compressor 1A are simultaneously started. If the turning gears of the steam turbines 6 are in operation during the generator 4 and motor 2A excitation sequence, then the compressor 1A will try to follow.
4. Then the steam flow is turned on and the steam turbine driven generator 4 will produce an electrical output similar to a frequency converter and the entire electrically interconnected string 4, 2A, via power transmission network 40 (as shown through bus bar 40a) will start smoothly and accelerate the two synchronous machines 4, 2A.
5. When the two synchronous machines 2A, 4 operated as generator 4 and motor 2A reach the rated speed, the entire string 2A, 4 can be synchronized via the power transmission network 40 with the rest of the electrical power system (through bus ties 60, 65).

The method above may also be used to enable semi-simultaneous start of several electrically interconnected synchronous machines, i.e. both motors and generators. The method is probably well suited for LNG production from remote and isolated gas fields and smaller oil and/or gas fields without access to pipelines. A twin or multi shaft gas turbine could replace the steam turbine in this start method Start Method No. 2

Large and XL Compressor Drive Start with variable electrical system frequency and voltage using a gas turbine driven generator (referring to FIG. 3):

1. Initially, a gas-turbine 7A driven generator 5A is slowed down to typically 60% or minimum speed, de-excited and assigned to start the specific electric motor 2A driven compressor 1A.
2. The generator 5A and motor 2A is then electrically interconnected in "unexcited" mode and the excitation systems of the generator are then activated to soft-start the un-excited synchronous machine as an induction motor at typically 60% of the operational frequency. The damping windings on the synchronous machine should not be overloaded in asynchronous mode or induction machine operation since the torque required to accelerate the compressor to approximately 60% speed is normally quite limited.
3. When the "induction-motor" is close to synchronous speed it is excited and enter into synchronous mode of operation together with the assigned generator.
4. When the synchronous machines operated as generator and motor reach the rated speed, then the entire string can be synchronized with the rest of the electrical system.

This start method no. 2 is regarded as a fairly robust start method and is expected to also enable simultaneous start of several electrically interconnected synchronous machines even if block-transformers are introduced. Thus this method provides additional equipment selection flexibility.

Start Method No. 3

Frequency controlled start with synchronous bypass at rated speed (referring to FIG. 4):

1. A synchronous bypass 60, 70 for synchronous speed operation is disconnected and a frequency converter device 80 is connected between a motor 2B and one or more generators 4A, 4B. The generators 4A, 4B supply power to accelerate the motor 2B, possibly from standstill.
2. When the compressor 1B has reached a rated speed, the frequency converter device 80 is disconnected and the synchronous by-pass 60, 70 is connected to free the frequency converter from service and allow the motor to be driven by the local power grid 40a, 40b. When this is accomplished, the AC-DC-DC-AC or frequency converter device 80 is free to be used to start another motor, e.g. motor 2A or for other purposes.

This start method no. 3 would be well suited for projects in which it is feasible to use a frequency converter device for more than one purpose. If the project is suitable for interface with other power systems via a HVDC-link, it should be noted that with the outlined arrangement it will be possible to start a fixed speed compressor drive independent of the other remote end of the DC-link, ref. FIG. 4. By this starting method the generators and motors may be started in the conventional way but without the need for a dedicated frequency converter for each motor. Hence, the number of frequency converters may be reduced down to only one.

The three methods described above are in particular aimed at electrical compressor drives without a gas or steam turbine on the mechanical string to drive them. However, synchronized speed operation is not only suitable for a compressor. The main principle could equally well be applied for the driving of any other appliance. By replacing the refrigerant compressor(s) 1 in the above figures and description by another appliance, such as for example a gas-compressor, a pump or a gas turbine that need a large start motor, a fixed speed drive and associated starting methods are disclosed in the above. Please note that a synchronous motor could be replaced by an induction motor in the previously mentioned start methods if the actual power range is suitable.

In an example a single-shaft industrial gas turbine drive including a suitable electrical machine on the string can be accelerated from zero speed to ram-speed for the gas turbine by the same principles as described for the electrical fixed speed concepts described above.

Figure 5:
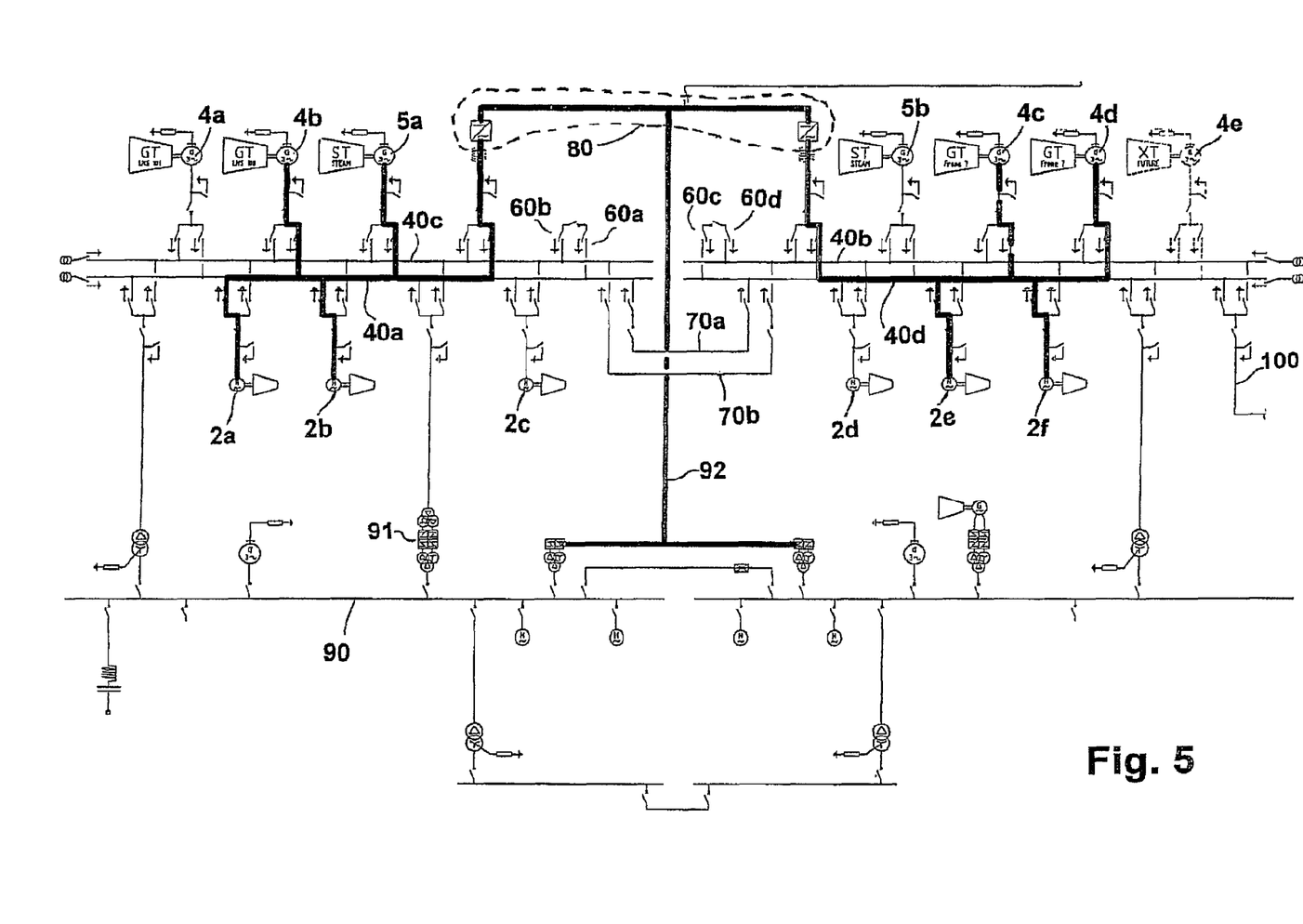
FIG. 5 illustrates an even more detailed diagram of coexisting power systems which may operate at different frequencies.

Referring to FIG. 5 will be described a system which is similar to, however a little more complex than, the system of FIG. 4.

In this system there are four bus bars, 40a, 40b, 40c, 40d to which a plurality of generators 4a-e, 5a-b and motors 2a-f can be connected. The generators and motors can each be connected to at least two of the bus bars 40a-d and the four bus bars 40a-d can be connected to either of the other bus bars 40a-d through bus ties 60a-b and 70a-b. The bus bars may also be connected to a local power supply system 90, to supply other consumers than the motors 2a-f or to make use of excess power generated on the local power supply system 90. The bus bars 40a-d can also be connected to an external power supply system 100, which may be a national or regional power supply system, for exchange of AC power.

The bus bars 40a-d may operate on different frequencies when they are not interconnected, e.g. as shown bus bars 40a and 40c may operate at 56 Hz and bus bars 40b and 40d operate at 61 Hz. In this case the bus bars operating at the same frequency may be interconnected. This flexibility provides the possibility to adapt the compressors to different operating rates. Hence the supply of, e.g. LNG may be adapted to external requirements without having to change the speed of the compressors.

If power is supplied between any of the bus bars 40a-d and the local system 90, it is possible, to do this via a DC link 91, so that the frequency of the bus bar 40a-d and the local system may be different.

It is also possible to supply power to the frequency converter 80 for start up of a generator/motor combination from the local system/network 90, as shown by the link 92.

A system with more than four bus bars is also conceivable.

For all the above examples the driving component (turbine) and the driven component (compressor) may be replaced with other types of components, e.g. a diesel engine as driving component and a pump as a driven component, without departing from the principles of the present invention.

Without repeating the detailed description for all possible appliances, the above description will be sufficient for any person skilled in the art to apply the same fixed speed drive technique and method for any other appliance than a compressor or gas turbine, provided there are no inherent features of the appliance which prevents such an arrangement. The arrangement and methods described above could equally well be used to drive all types of rotating equipment which can be mounted on a shaft, and typically powered by drivers such as for example electrical machines and gas turbines.

In a situation where the turbines, or generators, respectively, produce more power than needed by the first electrical machine(s), one may use the frequency converter 80 to produce DC-current suitable for exportation to other power systems/networks. One can also use the frequency converter 80 for producing power adapted for an external AC power network, such as the external system 100.

In summary it has been described how compressor drives is suitable for electrically driven fixed speed operation, with typical references to an LNG-plant. It is anticipated that there will be a significant cost/weight/space benefit by removing the dedicated VSD equipment from an electrical liquefaction compressor drive or the dedicated steam and/or gas turbine from a mechanical compressor drive.

A similar chain of arguments could most likely be used on a typical pipeline booster compressor drive and other large drives suitable for fixed speed operation, in order to improve regularity and reduce maintenance, construction cost, etc.

The three synchronous speed concepts described are compatible with the defined transient and off-duty LNG-plant scenarios including start-up and in addition, the fixed speed concepts are more robust versus transient voltage variations/dips than comparable frequency converter controlled drives.

It should also be highlighted that an electrical system design that enables start and operation of large and or remote fixed speed drives based on the principles outlined for the present invention gives a flexibility that can enable operation of electrical fixed speed drives in an electrical power system with variable system frequency independent of the fixed frequency power distribution to the required utilities and optional interconnections with the local, regional or national power grid.

The invention claimed is:

1. A method of starting and operating an electrically driven load driven by a first electrical machine in a power range of 10 MW and above, comprising:
   supplying power from a mechanical driver;
   in an acceleration phase, accelerating the first electrical machine as a motor for said load, from zero, near zero or at low speed, by:
      accelerating a second electrical machine connected to said mechanical driver, the second electrical machine being electrically interconnected to said first electrical machine and functioning as a generator, whereby the connection of the second electrical machine is dedicated to the first electrical machine;
   synchronizing the first electrical machine with a local power network; and then
   after the acceleration phase, operating the first electrical machine by providing it with power from the local power network, the network is provided with power from:
   a) an external power network; or
   b) at least one mechanical driver connected to at least one second electrical machine.

2. The method according to claim 1 wherein the mechanical driver comprises a steam turbine, and that the acceleration phase comprises starting the steam turbine at or near zero speed.

3. The method according to claim 1 further comprising in the acceleration phase, accelerating the first electrical machine from zero speed as an induction motor by controlled energizing of the second electrical machine driven by a gas turbine operated at its minimum speed.

4. The method according to claim 1 wherein the acceleration of the second electrical machine is provided by accelerating a gas turbine running from its minimum speed and up the rated speed, while being mechanically coupled to the second electrical machine.

5. The method according to claim 1 further comprising operating a single or a plurality of fixed speed electrical drives in a segregated power system with variable system frequency in order to adapt to process variations and flow or capacity control requirements, independent of the utilities from a system with fixed frequency.

6. A method of starting and operating of an electrically driven subsea load driven by a first electrical machine, the method comprising:
supplying power from a mechanical driver, a frequency converter receiving power from an external power network, or a local source, in an acceleration phase;
accelerating the first electrical machine as a motor for said subsea load, from zero, near zero or at low speed, by either;
accelerating a second electrical machine connected to said mechanical driver, the second electrical machine being electrically interconnected to said first electrical machine and functioning as a generator, whereby the connection of the second electrical machine is dedicated to the first electrical machine; or
b) supplying power to the first electrical machine from said frequency converter;
synchronizing the first electrical machine with a local power network; and then
after the acceleration phase, operating the first electrical machine by providing it with power from the local power network, which network is provided with power from:
a) an external power network; or
b) at least one mechanical driver connected to at least one second electrical machine;
thereby rendering the frequency converter available for other tasks.

7. The method according to claim 6 wherein the mechanical driver comprises a steam turbine, and that the acceleration phase comprises starting the steam turbine at or near zero speed.

8. The method according to claim 6 further comprising in the acceleration phase, accelerating the first electrical machine from zero speed as an induction motor by controlled energizing of the second electrical machine driven by a gas turbine operated at its minimum speed.

9. The method according to claim 6 wherein the acceleration of the second electrical machine is provided by accelerating a gas turbine running from its minimum speed and up the rated speed, while being mechanically coupled to the second electrical machine.

10. The method according to claim 6 further comprising operating a single or a plurality of fixed speed electrical drives in a segregated power system with variable system frequency in order to adapt to process variations and flow or capacity control requirements, independent of the utilities from a system with fixed frequency.

11. The method according to claim 6 further comprising after the acceleration phase, using the frequency converter to adapt power from the external power network to the characteristics of the local power network, or adapting power from the local power network to the characteristics of the external power network, thereby rendering it possible to import and/or export power to and/or from the local power system.

12. A start and operation system for the starting and operating of at least one mechanical load, the system comprising:
the load connected to and driven by at least one first electrical machine in the power range of 10 MW and above;
a mechanical driver connected to a second electrical machine, the second electrical machine adapted to be uniquely electrically connected to one or more first electrical machines, thereby working as a generator during an acceleration phase or a succeeding operation phase;
a frequency converter adapted to be uniquely connected to one or more first electrical machines, thereby accelerating said first electrical machine in an acceleration phase or operating the first electrical machine in an operation phase; and
the frequency converter adapted to be provided with power from either an external power network or a local power network;
an electric power transmission network for interconnection of first and second electrical machines, the network comprises at least a double bus bar or at least a double circuit breaker system to enable parallel utilization of other electrical equipment independent of the actions of the second electrical machine for starting the first electrical machine.

13. The system according to claim 12 wherein the mechanical driver comprises a steam turbine, and that the system is adapted to accelerate the first electrical machine by starting the mechanical driver and second electrical machine from zero or near zero speed.

14. The system according to claim 12 wherein the mechanical driver comprises a gas turbine connected to the second electrical machine, and that the system is adapted to accelerate the first electrical machine from zero or low speed by controlled energizing of the second electrical machine with the gas turbine.

15. The system according to claim 14 wherein the acceleration of the second electrical machine is provided by accelerating a gas turbine running from its minimum speed and up the rated speed, while being mechanically coupled to the second electrical machine.

16. The system according to claim 12 wherein the frequency converter is adapted to adapt power from the local power network to the characteristics of the external power network, enabling export of power from the local to the external power network.

17. The system according to claim 12 wherein the power transmission network comprises at least two bus bars adapted to operate at least two different frequencies.

18. A start and operation system for the start and operation of at least one mechanical subsea load, the system comprising:
the subsea load connected to and driven by at least one first electrical machine;
a mechanical driver connected to a second electrical machine, the second electrical machine adapted to be uniquely electrically connected to one or more first electrical machines, thereby working as a generator during an acceleration phase or a succeeding operation phase;
a frequency converter, adapted to be uniquely connected to one or more first electrical machines, thereby accelerating said first electrical machine in an acceleration phase or operating the first electrical machine in an operation phase;
the frequency converter adapted to be provided with power from either an external power network or a local power network; and
an electric power transmission network for interconnection of first and second electrical machines, the network comprises at least a double bus bar or at least a double circuit breaker system to enable parallel utilization of other electrical equipment independent of the actions of the second electrical machine for starting the first electrical machine.

19. The system according to claim 18 wherein the mechanical driver comprises a steam turbine, and that the system is adapted to accelerate the first electrical machine by starting the mechanical driver and second electrical machine from zero or near zero speed.

20. The system according to claim 18 wherein the mechanical driver comprises a gas turbine connected to the second electrical machine, and that the system is adapted to accelerate the first electrical machine from zero or low speed by controlled energizing of the second electrical machine with the gas turbine.

21. The system according to claim 20 wherein the acceleration of the second electrical machine is provided by accelerating a gas turbine running from its minimum speed and up the rated speed, while being mechanically coupled to the second electrical machine.

22. The system according to claim 18 wherein the frequency converter is adapted to adapt power from the local power network to the characteristics of the external power network, enabling export of power from the local to the external power network.

23. The system according to claim 18 wherein the power transmission network comprises at least two bus bars adapted to operate at least two different frequencies.

24. A method of starting and operating an electrically driven load driven by a first electrical machine in a power range of 10 MW and above, comprising:
supplying power from a mechanical driver, a frequency converter receiving power from an external power network, or a local source;
in an acceleration phase, accelerating the first electrical machine as a motor for said load, from zero, near zero or at low speed, by supplying power to the first electrical machine from said frequency converter;
synchronizing the first electrical machine with a local power network; and then after the acceleration phase, operating the first electrical machine by providing it with power from the local power network, the network is provided with power from at least one mechanical driver connected to at least one second electrical machine, wherein the frequency converter is then used for producing HVDC-current which is exported.

* * * * *

UNITED STATES PATENT AND TRADEMARK OFFICE
CERTIFICATE OF CORRECTION

| | | |
|---|---|---|
| PATENT NO. | : 8,872,467 B2 | Page 1 of 1 |
| APPLICATION NO. | : 13/589705 | |
| DATED | : October 28, 2014 | |
| INVENTOR(S) | : Bjerknes et al. | |

It is certified that error appears in the above-identified patent and that said Letters Patent is hereby corrected as shown below:

In the Claims

Column 11, Line 19: Claim 6, Delete "accelerating a second" and insert -- a) accelerating a second --

Signed and Sealed this
Seventeenth Day of February, 2015

Michelle K. Lee
*Deputy Director of the United States Patent and Trademark Office*